(12) United States Patent
Lee et al.

(10) Patent No.: US 8,600,420 B2
(45) Date of Patent: Dec. 3, 2013

(54) METHOD AND APPARATUS FOR UPLINK TIMING SYNCHRONIZATION WITH RANGING SIGNAL IN MOBILE COMMUNICATION SYSTEM

(75) Inventors: Young-Ha Lee, Daejeon (KR); Chang-Wahn Yu, Daejeon (KR); Youn-Ok Park, Daejeon (KR)

(73) Assignees: Samsung Electronics Co., Ltd., Suwon-si (KR); Electronics and Telecommunications Research Institute, Daejeon (KR); KT Corporation, Seongnam (KR); SK Telecom Co., Ltd., Seoul (KR); Hanaro Telecom, Inc., Seoul (KR)

( * ) Notice: Subject to any disclaimer, the term of this patent is extended or adjusted under 35 U.S.C. 154(b) by 449 days.

(21) Appl. No.: 12/094,763

(22) PCT Filed: Dec. 8, 2006

(86) PCT No.: PCT/KR2006/005329
§ 371 (c)(1), (2), (4) Date: May 22, 2008

(87) PCT Pub. No.: WO2007/067006
PCT Pub. Date: Jun. 14, 2007

(65) Prior Publication Data
US 2008/0305804 A1 Dec. 11, 2008

(30) Foreign Application Priority Data

Dec. 8, 2005 (KR) .......................... 10-2005-0119986
Dec. 4, 2006 (KR) .......................... 10-2006-0121232

(51) Int. Cl.
H04B 15/00 (2006.01)
H04W 72/00 (2009.01)
H04W 74/00 (2009.01)
H04W 4/00 (2009.01)
H04J 3/06 (2006.01)

(52) U.S. Cl.
USPC ........... 455/517; 455/450; 455/455; 370/330; 370/350

(58) Field of Classification Search
USPC ................... 370/350, 329–330; 455/450, 455
See application file for complete search history.

(56) References Cited

U.S. PATENT DOCUMENTS

| 6,388,997 | B1 * | 5/2002 | Scott .............................. 370/280 |
| 6,967,936 | B1 * | 11/2005 | Laroia et al. ................... 370/329 |
| 7,133,352 | B1 * | 11/2006 | Hadad ............................ 370/208 |
| 2004/0174845 | A1 | 9/2004 | Koo et al. |
| 2005/0117539 | A1 | 6/2005 | Song et al. |
| 2005/0286465 | A1 * | 12/2005 | Zhuang ......................... 370/329 |
| 2006/0203765 | A1 * | 9/2006 | Laroia et al. .................. 370/328 |
| 2007/0021122 | A1 * | 1/2007 | Lane et al. .................... 455/441 |

FOREIGN PATENT DOCUMENTS

| KR | 10-2001-0082061 A | 8/2001 |
| KR | 10-2003-0058589 A | 7/2003 |
| KR | 10-2004-0079603 A | 9/2004 |
| KR | 10-2005-0052124 A | 6/2005 |
| KR | 10-2005-0089709 A | 9/2005 |
| WO | 01/35543 A2 | 5/2001 |

OTHER PUBLICATIONS

Nogueroles, Bossert, Donder, and Zyablov, Improved Performance of a Random OFDMA Mobile Communication System, Vehicular Technology Conference VTC '98, May 1998, pp. 2502-2506, IEEE.

* cited by examiner

*Primary Examiner* — George Eng
*Assistant Examiner* — Nam Huynh
(74) *Attorney, Agent, or Firm* — Jefferson IP Law, LLP (57) ABSTRACT

When a base station of a time division duplex based mobile communication system receives an initial ranging request signal from a subscriber station, the base station generates initial ranging information including delay time information to the subscriber station, and receives uplink data delayed and transmitted using a delay time from the subscriber station. Also, when the subscriber station transmits an initial ranging request signal to the base station and receives initial ranging information including delay time information from the base station, the subscriber station establishes a transmission parameter value by using the transmission parameter value included in the initial ranging information and transmits uplink data by using the established delay time.

18 Claims, 7 Drawing Sheets

METHOD AND APPARATUS FOR UPLINK TIMING SYNCHRONIZATION WITH RANGING SIGNAL IN MOBILE COMMUNICATION SYSTEM

TECHNICAL FIELD

The present invention relates to an uplink time synchronization method using a ranging signal in a mobile communication system. In particular, the present invention relates to an uplink synchronization method and device between a subscriber station with mobility and a base station in a mobile communication system on the orthogonal frequency division multiple access (OFDMA) and time division duplex (TDD) basis.

BACKGROUND ART

As the electronics and communication techniques have been substantially developed, a wireless speech calling service and a wireless Internet service using a wireless communication network have been provided. Recently, as the main mobile communication services have been switched from the voice service with the constant data rate to the packet service with variable data rates, the OFDMA scheme for easy interference hindrance has been used other than the CDMA scheme for maintaining predetermined interference through interference averaging.

The OFDMA based mobile communication system (i.e., OFDMA system) has used the frequency division duplex method (FDD) and the time division duplex (TDD) so as to transmit and receive signals between the subscriber station and the base station.

Figure 1:
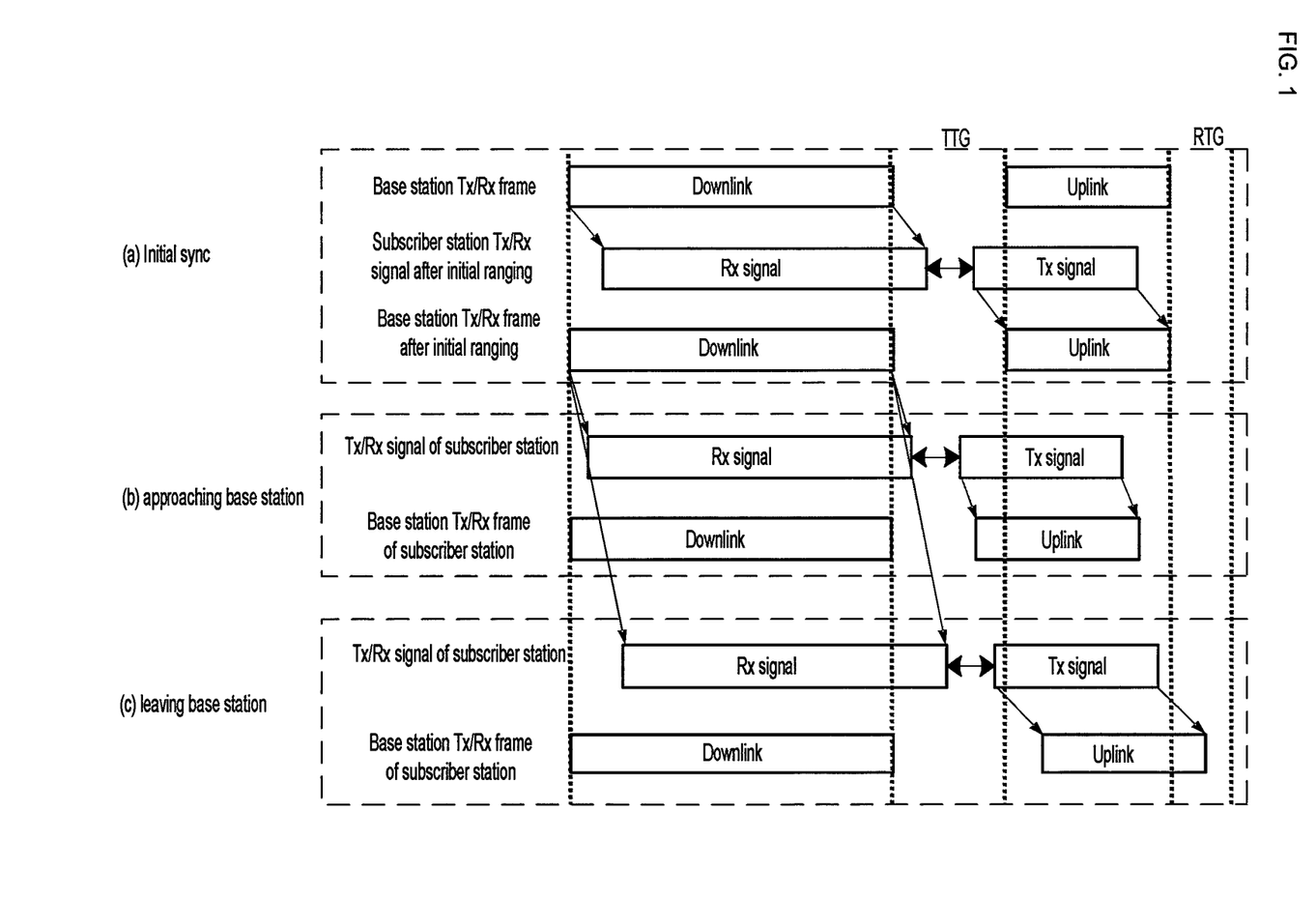
FIG. 1 shows a schematic diagram for a TDD frame transmitted and received when the subscriber station moves after initial synchronization by the OFDMA system.

In the TDD method of the OFDMA system, a downlink and an uplink coexist in the frame structure, and as shown in FIG. 1, a Tx/Rx transition gap (TTG) and an Rx/Tx transition gap (RTG), that is, guard time for identifying forward and reverse transmission time are inserted between a downlink and an uplink. In order to synchronize the downlink time in the OFDMA system, the subscriber station measures the preamble signal of the downlink provided by the base station and corrects downlink time synchronization.

In the OFDMA TDD based uplink, the subscriber station is to be synchronized with the base station. The subscribers transmit the uplink through another allocated subchannel, and hence, accurate uplink synchronization is required according to the OFDMA symbol processing characteristic. When the OFDMA uplink symbol of the subscriber station is not accurately synchronized, a signal of a specific subscriber station generates interference to a signal of another subscriber station and the base station may fail to accurately detect signals.

In order to prevent the above-described situation, the subscriber station transmits a pseudo random binary sequence (PRBS) to the base station, the base station detects the same to estimate a delay distance so that each subscriber station is synchronized when the base station is synchronized, which is called a ranging method. In the ranging method, on accessing the base station, the subscriber station transmits a ranging signal for correcting a timing error.

The ranging in the OFDMA system is classified as initial ranging, hand-off ranging, bandwidth request ranging, and periodic ranging.

The initial ranging controls the subscriber station's transmission power, time, and frequency offset when the subscriber station initially accesses the base station, and the initial ranging is performed to start an initial signal access process.

The hand-off ranging is performed to control transmission power, time, and frequency offset for accessing a new base station when the subscriber station is handed off to another base station.

The bandwidth request ranging is performed to request a bandwidth for transmitting uplink traffic generated to the subscriber station.

The periodic ranging accurately measures varied power, time, and frequency offset when the subscriber station moves to change the delay distance, and the periodic ranging is performed at regular time intervals so as to correct the varied values.

The initial ranging is used for the subscriber station to be initially synchronized with the corresponding base station, and the subscriber station receives a downlink and transmits a ranging signal. In the TDD method, a TTG is provided between the downlink and the uplink, and the TTG relating to the cell radius of the base station has a value which is greater than twice the maximum propagation delay between the base station and the subscriber station, that is, greater than the round trip delay. Accordingly, the initial ranging signal is transmitted in the TTG interval.

For the above-described initial ranging, the OFDM symbol is transmitted through two symbol intervals. When the OFDM symbol reaches a transmitted signal transmission interval or a received signal transmission interval, the base station loses a valid symbol and the subscriber station transmits the OFDM symbol through two consecutive symbol intervals.

When periodic ranging and a bandwidth request ranging are performed after initial ranging is performed, the subscriber station transmits a ranging signal through an OFDM symbol so that a timing error is generated in a guard interval.

In this instance, when the subscriber station approaches the base station or leaves the base station, a downlink receiving time of the subscriber station and an uplink receiving time of the base station are varied.

Figure 2:
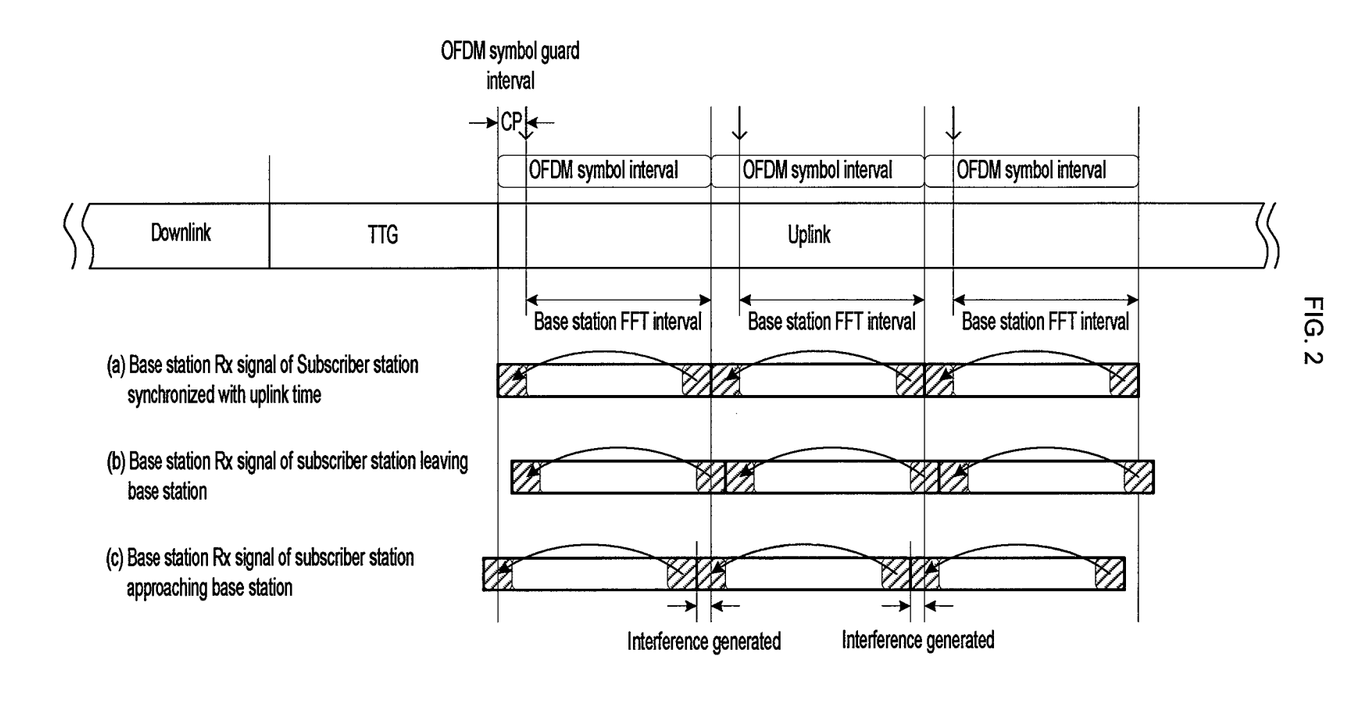
FIG. 2 shows a schematic diagram for generation of interference when the subscriber station approaches the base station after initial synchronization.

FIG. 1 shows a schematic diagram for a TDD frame transmitted and received when the subscriber station moves after initial synchronization by the OFDMA system, and FIG. 2 shows a schematic diagram for generation of interference when the subscriber station approaches the base station after initial synchronization.

As shown in FIG. 1, the signal transmitted and received between the subscriber station and the base station after initial synchronization is given as (a). However, when the subscriber station approaches the base station as given in (b), a downlink receiving time by the subscriber station and an uplink receiving time by the base station are quickened. When the subscriber station leaves the base station as given in (c), the downlink receiving time by the subscriber station and the uplink receiving time by the base station are delayed.

That is, the propagation delay between the base station and the subscriber station is variable by the position movement of the subscriber station. Therefore, when the subscriber station accurately perform uplink time synchronization and the subscriber station approaches the base station after initial ranging, interference of a next symbol is generated in the interval for performing fast Fourier transform (FFT) by a base station demodulator because of decrease of propagation delay as shown in FIG. 2.

As shown in FIG. 2, in order to access the base station through an uplink, the subscriber station transmits OFDM symbols during a given time slot. In this instance, when the subscriber station transmits uplink data by using allocated subcarriers, orthogonality between the subcarriers is lost and interference is generated when a plurality of subscriber stations are not synchronized as the subscriber station approaches or leaves the base station.

In this instance, when the periodic ranging is processed quickly, it is required to measure the timing error using the ranging in the OFDM symbol guard interval, and hence, the interference generated in the symbol is not solved. Also, when the subscriber station transmits the periodic ranging signal through two OFDM symbol intervals in a like manner of the initial ranging, the problem of degrading the system capacity and performance may be generated according to the period of the periodic ranging.

DISCLOSURE

Technical Problem

The present invention has been made in an effort to provide an uplink time synchronization method for correcting a time error by using ranging so as to provide accurate synchronization between a subscriber station and a base station in mobile communication system, a base station device thereof, and a subscriber station device thereof.

Technical Solution

In one aspect of the present invention, in a method for a base station of a mobile communication system to synchronize a subscriber station and an uplink time, a method for a base station to synchronize an uplink time includes: receiving an initial ranging request signal for initial ranging from the subscriber station; generating initial ranging information including delay time information for delay transmission of uplink data in response to the initial ranging request signal; transmitting the initial ranging information to the subscriber station; and receiving the uplink data transmitted with a delay by using the delay time from the subscriber station.

In another aspect of the present invention, in a method for a subscriber station of a mobile communication system to synchronize a base station and an uplink time, a method for a subscriber station to synchronize an uplink time includes: transmitting an initial ranging request signal for initial ranging to the base station; receiving initial ranging information including delay time information for delay transmission of uplink data from the base station; performing initial ranging by using transmission parameter values included in the initial ranging information; and transmitting uplink data by using a delay time established through the initial ranging.

In another aspect of the present invention, in a device for synchronizing a subscriber station and an uplink time by using a delay time in a base station of a mobile communication system, a device includes: a means for receiving an initial ranging request signal for initial ranging from the subscriber station; a means for generating initial ranging information including delay time information established for delay transmission of uplink data in response to the initial ranging request signal; a means for transmitting the generated initial ranging information to the subscriber station; and a means for receiving the uplink data delayed and transmitted by using the delay time from the subscriber station.

In another aspect of the present invention, in a subscriber station for synchronizing a base station of a mobile communication system and an uplink time, a subscriber station includes: a means for transmitting an initial ranging request signal for initial ranging to the base station; a means for receiving initial ranging information including delay time information established for delay transmission of uplink data from the base station; a means for performing initial ranging by using a transmission parameter value included in the initial ranging information; and a means for transmitting the uplink data by using a delay time established through the initial ranging.

Advantageous Effects

According to the embodiment of the present invention, efficient periodic detection of a ranging signal and reliability on the transmitted uplink data are maintained when the subscriber station moves, in particular, it approaches the base station by performing synchronization greater than the interference area generated by the previous symbol in the CP interval in the OFDMA system and transmitting uplink data.

Also, reliability of uplink data transmitted and received in the OFDMA system can be maintained by establishing the uplink synchronization to have no interference within the CP in a like manner of performing initial ranging while performing periodic ranging and thus efficiently performing the time synchronization problem of the uplink of the subscriber station having mobility.

BEST MODE

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" or variations such as "comprises" will be understood to imply the inclusion of stated elements but not the exclusion of any other elements.

Also, the term of a module in the present specification represents a unit for processing a predetermined function or operation, which can be realized by hardware, software, or combination of hardware and software.

In the embodiment of the present invention, the mobile communication system detects and corrects the time error and signal intensity between the subscriber station and the base station, and tracks and corrects the periodic time error and signal intensity of the subscriber station having mobility to thereby maintain the uplink transmission quality. The mobile communication system according to an embodiment of the present invention will be described based on the TDD OFDMA system, and the present invention is applicable to other mobile communication systems.

The OFDMA type transmission signal, that is, the subscriber station's transmission signal is expressed in Equation 1.

$$x(n) = \frac{1}{N} \sum_{k=0}^{N-1} X(k) \cdot e^{j\frac{2\pi kn}{N}}, (n = 0, 1, 2, \ldots, N-1)$$ (Equation 1)

The output signal [x(n)] in Equation 1 is acquired when the subscriber station performs inverse Fourier transform on an input signal [X(k)]. In this instance, when the base station and the subscriber station are not accurately synchronized, the output signal [x(n−τ)] is given as Equation 2.

$$\begin{aligned}x(n - \tau) &= \frac{1}{N} \sum_{k=0}^{N-1} X(k) \cdot e^{j\frac{2\pi k(n-\tau)}{N}} \\ &= \frac{1}{N} \sum_{k=0}^{N-1} X(k) \cdot e^{j\frac{2\pi kn}{N}} \cdot e^{-j\frac{2\pi k\tau}{N}}\end{aligned}$$ (Equation 2)

When the output signal [x(n−τ)] of Equation 2 is Fourier transformed by a base station demodulator, the product in the complex exponential format is given as an error in Equation 3.

$$DFT\{x(n - \tau)\} = X(k) \cdot e^{-j\frac{2\pi k\tau}{N}}$$ (Equation 3)

In order to eliminate the error in Equation 3, the uplink time synchronization method and device perform a little delayed synchronization in consideration of delay other than performing initial ranging and synchronizing the base station received signal of the subscriber station with the uplink. In this instance, the delay considered to synchronization is related to the speed of the subscriber station supported in advance by the base station.

An available moving speed of the subscriber station can be established to the base station. For example, the base station providing a portable Internet service can be established to support a data service for the subscriber station moving at the speed within 60 km/h. A delay time corresponding that of the base station can be established to the subscriber station in advance.

An uplink time synchronization method applying a delay time in consideration of the subscriber station's mobility according to a first embodiment of the present invention will now be described with reference to FIG. 3 to FIG. 5.

Figure 3:
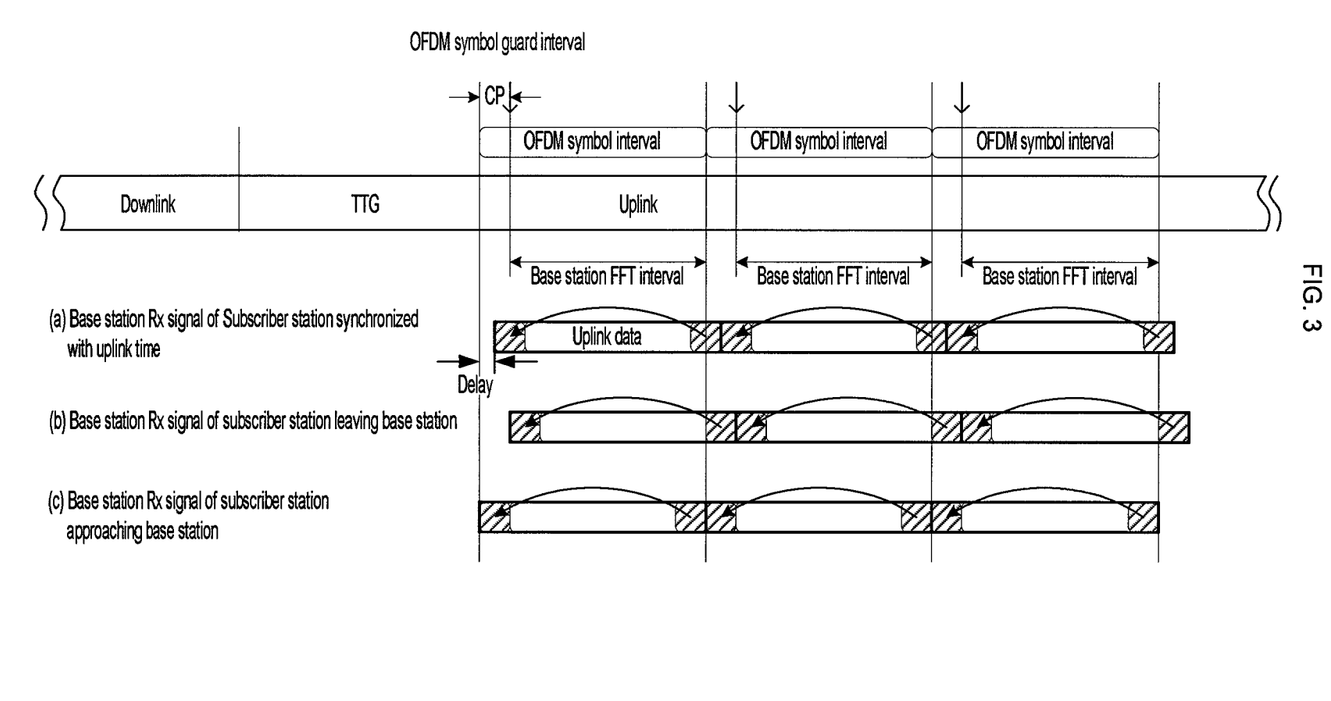
FIG. 3 shows a schematic diagram for an uplink synchronization method applying a delay time by considering mobility of a subscriber station according to a first embodiment of the present invention.

FIG. 3 shows a schematic diagram for an uplink synchronization method according to a first embodiment of the present invention.

Receiving of the OFDM symbol between the base station and the subscriber station to both of which a delay time is established is delayed by a predetermined delay time compared to the conventional receiving of OFDM symbols shown in FIG. 2.

Accordingly, the subscriber station having no distance change to the base station transmits an OFDM symbol delayed by a predetermined delay time as shown in (a). That is, a cyclic prefix (CP) added to the former part of the uplink data in the OFDM symbol digresses from an OFDM symbol guard interval (referred to as a CP interval hereinafter) by the delay time. In this instance, an OFDM symbol except the CP that is, uplink data are included in the fast Fourier transform (FFT) interval of the base station, and hence, signals without generation of interference are transmittable.

The subscriber station leaving the base station transmits an OFDM symbol delayed by the sum of a predetermined delay time and a delay time caused by the moving distance of the subscriber station as shown in (b). Accordingly, the CP added to the former part of the uplink data is transmitted in the area established to be an FFT interval of the OFDM symbol interval in the uplink, and the CP added to the latter part of the OFDM symbol is transmitted in the CP interval of the next OFDM symbol interval. In this instance, the subscriber station can transmit signals without generation of interference.

The subscriber station approaching the base station transmits an OFDM symbol delayed by the time generated by subtracting the delay time reduced according to the subscriber station's moving distance from a predetermined delay time as shown in (c). Therefore, the CP added to the former part of the uplink data is positioned at the CP interval of the corresponding OFDM symbol interval, and the uplink data are positioned at the FFT interval of the OFDM symbol interval. That is, one OFDM symbol is accurately positioned at one OFDM symbol. Hence, no interference is generated when the subscriber station approaching the base station transmits the OFDM symbol.

In this instance, the moving subscriber station is required to establish an FFT interval for transmitting uplink data in the uplink structure including a plurality of OFDM symbol intervals transmitted by the subscriber station shown in FIG. 3.

Figure 4:
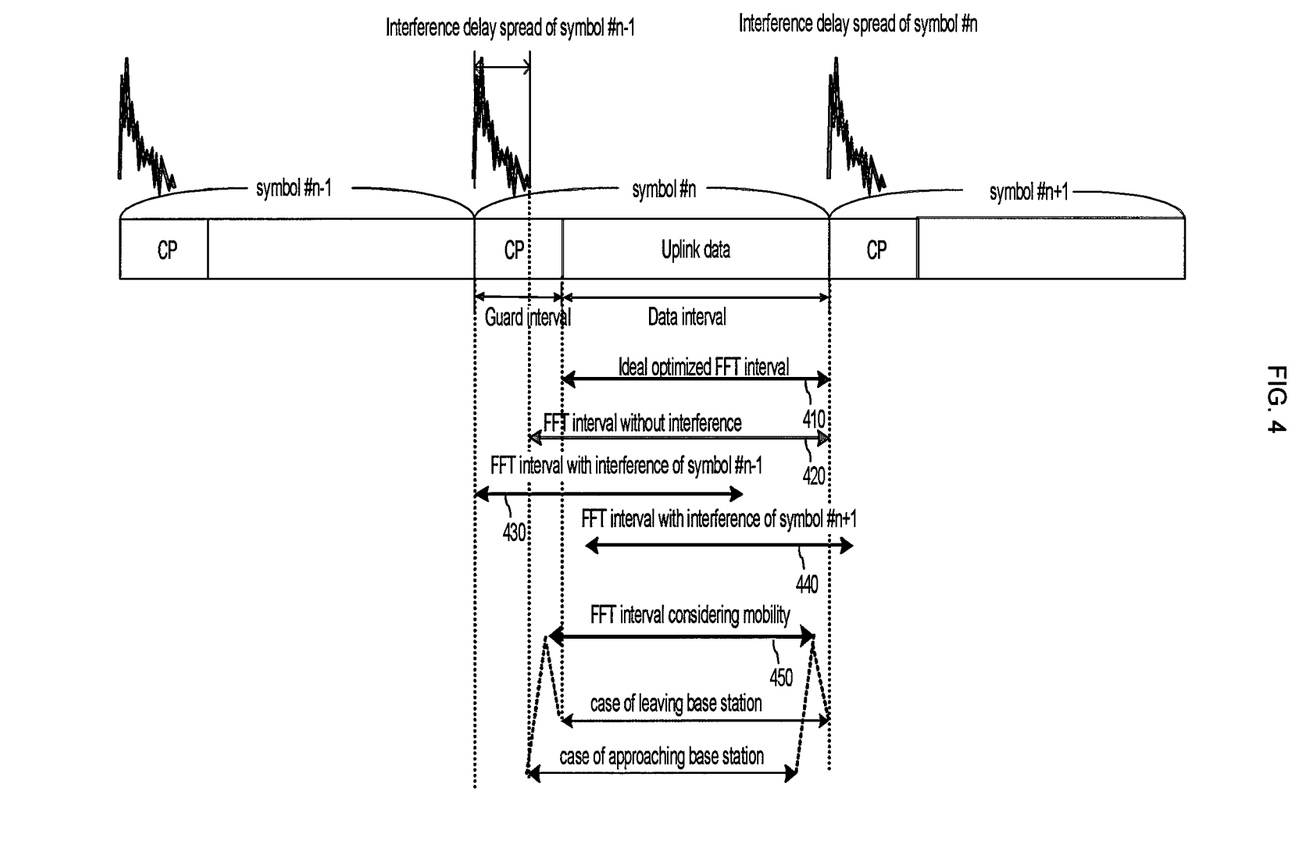
FIG. 4 shows a method for establishing an FFT interval for transmitting a symbol to a base station from a subscriber station according to a first embodiment of the present invention.

FIG. 4 shows a method for establishing an FFT interval for transmitting a symbol to a base station from a subscriber station according to a first embodiment of the present invention.

In order to transmit a symbol (symbol #n) to the base station, the subscriber station uses a data interval including a CP interval that is a guard interval and substantial uplink data. In this instance, the CP interval has an area in which interference occurs because of the previous symbol (symbol #n−1). Further, interference caused by the current symbol (symbol #n) is generated in the CP interval positioned at the former part of the next symbol (symbol #n+1).

The existing subscriber station has established the FFT interval of the base station for uplink data transmission without considering mobility. Accordingly, the ideal FFT interval 410 established for uplink data transmission by the subscriber station corresponds to the data interval.

Also, the CP interval established to be longer than the size of the area in which interference occurs has an area in which no interference exists. Accordingly, the subscriber station is required to transmit the uplink data having no data loss or interference in the ideal FFT interval 410 or within the FFT interval 420 without interference by a previous symbol. That is, the subscriber station transmits uplink data without interference or data loss by establishing an FFT interval for uplink transmission within the FFT interval 420 having no interference.

When the uplink data are transmitted in advance than the original receiving position as the general subscriber station approaches the base station, the FFT interval 430 established to the subscriber station includes an interval having interference generated because of the previous symbol (symbol #n−1). Therefore, the base station having received the symbol failed to receive and demodulate accurate uplink data because of the interference included in the FFT interval 430.

Also, when the uplink data are transmitted later than the original receiving position as the subscriber station leaves the base station, the FFT interval 440 established to the subscriber station is positioned behind the ideal FFT interval 410, and hence, part of the uplink data is positioned in the CP interval of the next symbol (symbol #n+1). In this instance, the base station cannot check part of the uplink data transmitted by the subscriber station.

According to the first embodiment of the present invention, when the FFT interval is advanced as the subscriber station approaches the base station, or when the FFT interval is delayed as the subscriber station leaves the base station, an FFT interval 450 established at the initial ranging is established to be a little prior to the ideal FFT interval (410, i.e., reference interval) so that the subscriber station may be positioned in the FFT interval 420 having no predetermined interference. In this instance, the advanced interval is calculated based on the delay time predetermined between the base station and the subscriber station.

Also, the subscriber station establishes the size of the area in which no interference in the CP interval is generated to be longer than twice a predetermined delay time so that the FFT interval 450 established at the initial ranging may be positioned near the center of the area in which no interference is generated.

Accordingly, the FFT interval 450 established in consideration of mobility of the subscriber station at the initial ranging is similar to the ideal optimized FFT interval 410 since the FFT interval 450 is delayed by a predetermined delay time when the subscriber station leaves the base station. When the subscriber station approaches the base station, the FFT interval 450 is advanced by a predetermined delay time. In this instance, the area in which no interference is generated in the CP interval is established to be greater than the delay time, and hence, the start part of the advanced FFT interval is positioned in the predetermined area in which no interference is generated. Accordingly, the base station can receive uplink data having no generated interference.

Figure 5:
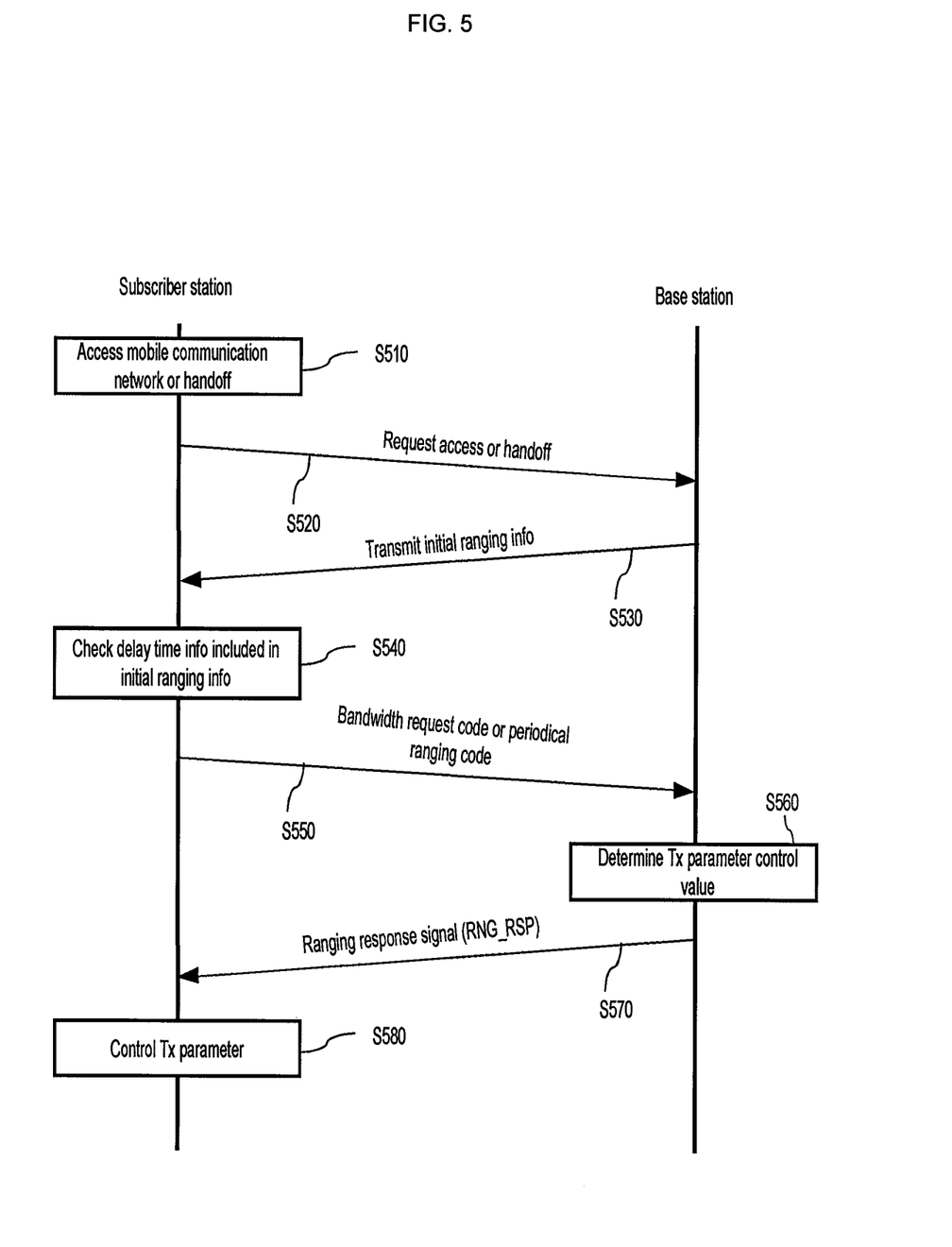
FIG. 5 shows a signal flowchart for synchronizing an uplink time and performing ranging according to a first embodiment of the present invention.

FIG. 5 shows a signal flowchart for synchronizing an uplink time and performing ranging according to a first embodiment of the present invention.

When power is applied to the subscriber station to attempt an access to the base station in the mobile communication network or the subscriber station is handed off to a corresponding base station from a previous base station (S510), the subscriber station transmits an access request signal or a hand-off request signal to the base station (S520).

On receiving the access request signal or the hand-off request signal, the base station transmits initial ranging information including transmission power, timing, and frequency offset to the subscriber station. In this instance, the timing information included in the initial ranging information includes delay time information for traffic transmission according to the first embodiment of the present invention (S530).

The subscriber station controls the power, timing, and frequency offset by using transmission parameter control values included in the received initial ranging information. The subscriber station checks the delay time information included in the initial ranging information to establish a delay time for transmitting and receiving the OFDM symbol to/from the base station (S540).

When the subscriber station finishes establishing the power, timing, frequency offset, and delay time, the initial ranging between the subscriber station and the base station is finished.

When the initial ranging is finished and the subscriber station generates uplink traffic to request band request ranging or requests periodic ranging according to predetermined expiration of a predetermined timer, the subscriber station transmits a bandwidth request code or a periodic ranging code to the base station. In this instance, the bandwidth request code or the periodic ranging code is transmitted to the base station by using the predetermined delay time defined in the step of S540.

Since the subscriber station transmits the bandwidth request code or periodic ranging code by using a delay time, the base station can accurately detect the bandwidth request code or periodic ranging code from the subscriber station positioned in a cell and approaching the base station and the subscriber station leaving the base station without interference (S550).

On receiving the bandwidth request code or the periodic ranging code, the base station controls the transmission parameters including the measured frequency offset, power, and timing (S560), and generates a ranging response signal RNG_RSP including the controlled transmission parameters.

In this instance, the generated RNG_RSP includes uplink radio resource information including an uplink interval usage code (UIUC) for indicating a used code in the uplink interval, a repetition code indication for indicating a repetition code used for traffic transmitting/receiving, a frame number index for indicating the number of frames for traffic transmission, a ranging code, a ranging symbol, a ranging subchannel, and a bandwidth (BW) request mandatory for indicating a bandwidth request identifier.

The base station transmits the RNG_RSP including the controlled transmission parameters and the uplink radio resource information to the subscriber station (S570).

The subscriber station controls the power, timing and frequency offset by using the transmission parameter control values in the received RNG_RSP, and transmits and receives data to/from the base station by using the controlled transmission parameters. In this instance, when transmitting uplink data to the base station, the subscriber station transmits the same by using the delay time established in the step of S530 (S580).

Therefore, the moving subscriber station can establish uplink synchronization with the base station, and can transmit and receive uplink data to/from the same in the OFDMA system.

A device for performing the uplink time synchronization method according to the first embodiment of the present invention will now be described with reference to FIG. 6 and FIG. 7.

Figure 6:
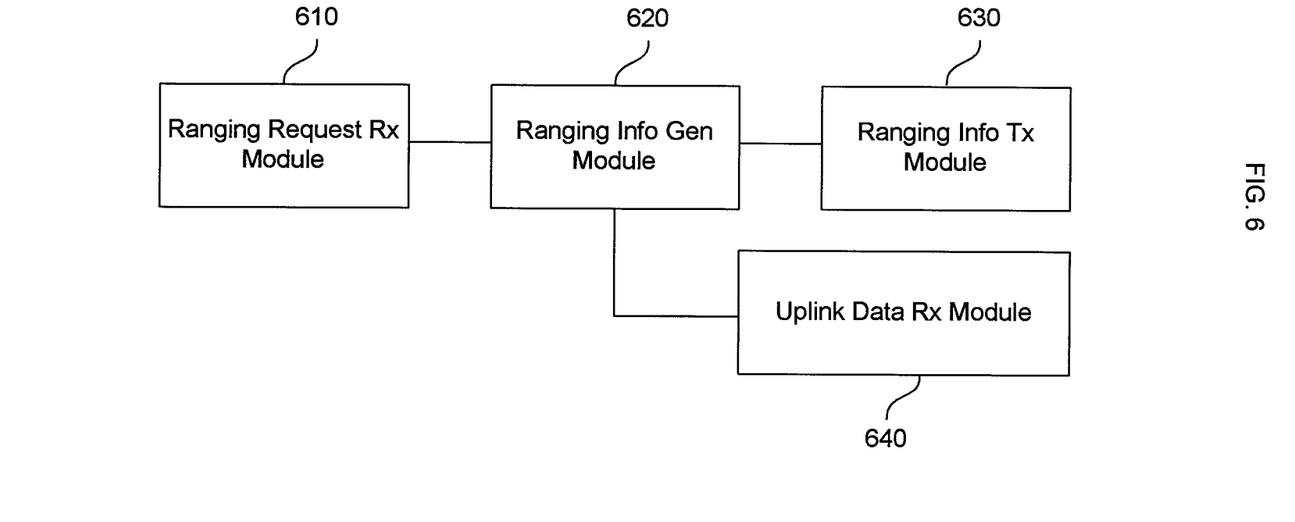
FIG. 6 shows a brief block diagram for an uplink time synchronizer of a base station according to a second embodiment of the present invention.

FIG. 6 shows a brief block diagram for an uplink time synchronizer of a base station according to a second embodiment of the present invention.

As shown in FIG. 6, the uplink time synchronizer includes a ranging request receiving module 610, a ranging information generating module 620, a ranging information transmitting module 630, and an uplink data receiving module 640.

The ranging request receiving module 610 receives an initial ranging request signal from the subscriber station so as to perform initial ranging. The ranging information generating module 620 generates initial ranging information in response to the initial ranging request signal received from the subscriber station. In this instance, the ranging information generating module 620 includes predetermined delay time information in the initial ranging information for the uplink data's delay transmission. The ranging information transmitting module 630 transmits the generated initial ranging information to the subscriber station. The subscriber station transmits uplink data by using the delay time included in the initial ranging information, and the uplink data receiving module 640 receives the uplink data transmitted by the subscriber station using the delay time.

In this instance, when the uplink data receiving module 640 receives a bandwidth request code or a periodic ranging code from the subscriber station, the ranging information generating module 620 controls the transmission parameters including the measured frequency offset, power, and timing, and generates a ranging response signal including the controlled transmission parameters.

Figure 7:
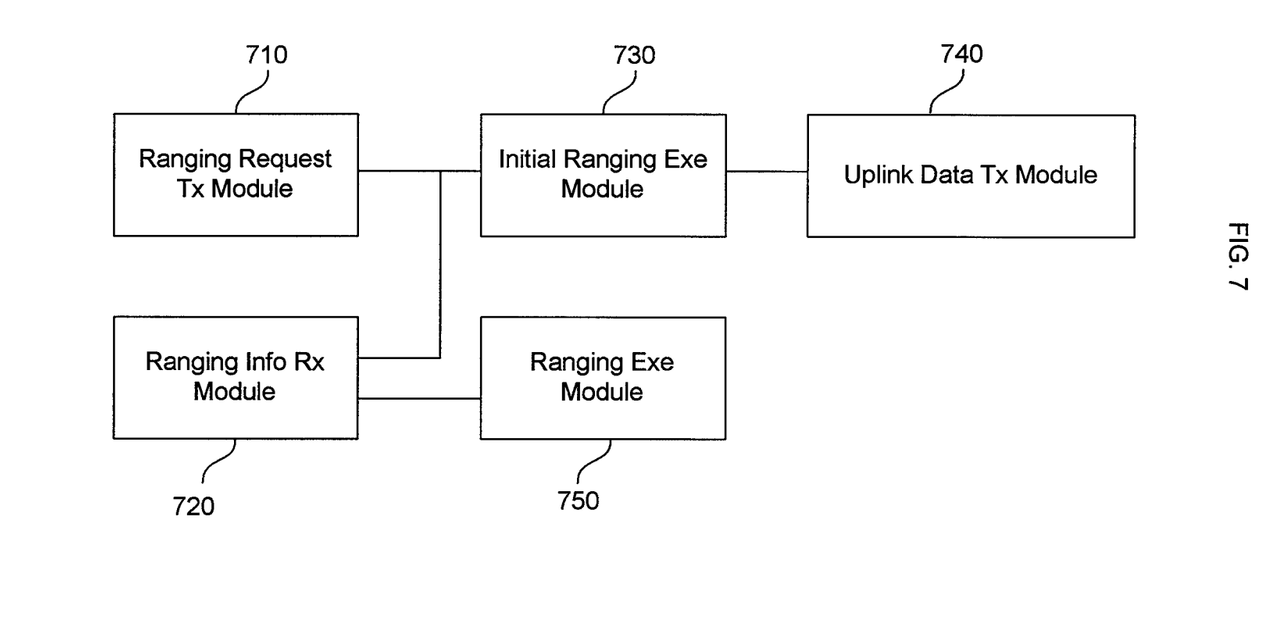
FIG. 7 shows a brief block diagram for a subscriber station according to a third embodiment of the present invention.

FIG. 7 shows a brief block diagram for a subscriber station according to a third embodiment of the present invention.

As shown in FIG. 7, the subscriber station includes a ranging request transmitting module 710, a ranging information receiving module 720, an initial ranging executing module 730, an uplink data transmitting module 740, and a ranging executing module 750.

The ranging request transmitting module 710 transmits an initial ranging request signal for initial ranging generated by the initial ranging executing module 730 to the base station, and the base station transmits initial ranging information including delay time information predetermined for delay transmission of uplink data to the subscriber station. The ranging information receiving module 720 receives initial ranging information from the base station, and the initial ranging executing module 730 performs initial ranging by using the transmission parameters included in the initial ranging information. The uplink data transmission module 740 transmits uplink data by using a delay time established through initial ranging. To achieve this, the uplink data transmission module 740 establishes the FFT interval by advancing the FFT interval by the delay time as shown in FIG. 4.

When the uplink data transmission module 740 transmits a periodic ranging code for periodic ranging or transmits a bandwidth request code for band request ranging, the ranging executing module 750 performs periodic ranging or band request ranging. In detail, when the ranging information receiving module 720 receives a ranging response signal from the base station in response to the periodic ranging code or the bandwidth request code, the ranging executing module 750 controls the transmission parameters established through initial ranging according to the controlled values of the transmission parameters included in the ranging response signal.

The above-described embodiments can be realized through a program for realizing functions corresponding to the configuration of the embodiments or a recording medium for recording the program, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for a base station of a mobile communication system to synchronize a subscriber station and an uplink time, the method comprising:
    performing an initial ranging with the subscriber station and establishing a fast fourier transform (FFT) interval based on delay time for delay transmission of uplink data caused by movement of the subscriber station, wherein a starting position of the FFT is prior to a starting position of a reference FFT interval as much as the delay time;
    generating initial ranging information including the delay time information and transmitting the initial ranging information to the subscriber station; and
    receiving the uplink data transmitted by using the delay time from the subscriber station,
    wherein the uplink data transmitted by the subscriber station approaching the base station are transmitted faster than the uplink data transmitted by the subscriber station when not moving, and
    the uplink data transmitted by the subscriber station leaving the base station are transmitted later than the uplink data transmitted by the subscriber station when not moving.

2. The method of claim 1, wherein in the establishing the FFT interval, a size of an area in which no interference in a cyclic prefix (CP) interval positioned prior to the FFT is greater than the delay time.

3. The method of claim 1, wherein in the receiving the uplink data, a starting position of the FFT interval to the uplink data transmitted from the subscriber station approaching the base station is positioned at the area in which no interference in the CP interval, and a starting position of the FFT interval to the uplink data transmitted from the subscriber station leaving the base station corresponds to the starting position of the reference FFT interval.

4. The method of claim 1, wherein the delay time is established in advance between the base station and the subscriber station according to mobile communication service types supported by the base station.

5. The method of claim 1, wherein the uplink data includes a periodic ranging code for periodic ranging or a bandwidth request code for bandwidth request ranging.

6. The method of claim 1, wherein the uplink data include data transmitted using the delay time when the bandwidth request ranging is performed with the subscriber station.

7. A method for a subscriber station of a mobile communication system to synchronize a base station and an uplink time, the method comprising:
    transmitting an initial ranging request signal for initial ranging to the base station;
    receiving initial ranging information including delay time for delay transmission of uplink data caused by movement of the subscriber station after initial ranging and time offset and frequency offset which are for synchronization, from the base station;
    performing initial ranging by using transmission parameter values included in the initial ranging information; and
    transmitting the uplink data by using a delay time established through the initial ranging,
    wherein a starting point of a fast fourier transform (FFT) interval for data is prior to a starting position of a reference FFT interval as much as the delay time, and
    wherein in the transmitting the uplink data, based on the delay time, transmitting uplink data is faster than a set timing when approaching the base station and transmitting uplink data is delayed than a set timing when leaving the base station.

8. The method of claim 7, wherein information on transmission power, time offset, frequency offset, and the delay time is checked from the initial ranging information, and the initial ranging is performed by establishing the transmission power, the time, the frequency offset, and the delay time, and the delay time information is determined based on a speed of a subscriber station which is supported by the base station.

9. The method of claim 7, wherein transmitting of uplink data comprises delaying a periodic ranging code for requesting to perform the periodic ranging by the delay time, and transmitting the delayed period ranging code to the base station when a timer established for the periodic ranging is finished.

10. The method of claim 7, wherein transmitting of uplink data comprises delaying a bandwidth request code for transmitting the uplink traffic by the delay time, and transmitting the delayed bandwidth request code to the base station when uplink traffic to be transmitted to the base station is generated.

11. The method of claim 7, wherein the uplink data include at least one of the periodic ranging code and the bandwidth request code, and
the method further comprises:
receiving a ranging response signal on the uplink data from the base station; and
controlling an initial ranging value established by the initial ranging by using the transmission parameter control values included in the ranging response signal.

12. The method of claim 11, further comprising delaying the uplink traffic by the delay time by using the controlled initial ranging value, and transmitting the delayed uplink traffic to the base station.

13. The method of claim 7,
wherein a size of an area in which no interference in a cyclic prefix (CP) interval positioned prior to the FFT is greater than the delay, and
wherein a starting position of the FFT interval to the uplink data transmitted from the subscriber station approaching the base station is positioned at the area in which no interference in the CP interval, and a starting position of the FFT interval to the uplink data transmitted from the subscriber station leaving the base station corresponds to the starting position of the reference FFT interval.

14. A device for synchronizing a subscriber station and an uplink time by using a delay time in a base station of a mobile communication system, the device comprising:
means for receiving an initial ranging request signal for initial ranging from the subscriber station;
means for establishing a fast fourier transform (FFT) interval based on delay time for delay transmission of uplink data caused by movement of the subscriber station, wherein a starting position of the FFT is prior to a starting position of a reference FFT interval as much as the delay time, and generating initial ranging information including the delay time, in response to the initial ranging request signal;
means for transmitting the generated initial ranging information to the subscriber station; and
means for receiving the uplink data delayed and transmitted by using the delay time from the subscriber station,
wherein the uplink data transmitted by the subscriber station approaching the base station are transmitted faster than the uplink data transmitted by the subscriber station when not moving and the uplink data transmitted by the subscriber station leaving the base station are transmitted later than the uplink data transmitted by the subscriber station when not moving.

15. The device of claim 14, wherein
a size of an area in which no interference in a cyclic prefix (CP) interval positioned prior to the FFT is greater than the delay time, and
wherein a starting position of the FFT interval to the uplink data transmitted from the subscriber station approaching the base station is positioned at the area in which no interference in the CP interval, and a starting position of the FFT interval to the uplink data transmitted from the subscriber station leaving the base station corresponds to the starting position of the reference FFT interval.

16. A subscriber station for synchronizing a base station of a mobile communication system and an uplink time, the subscriber station comprising:
means for transmitting an initial ranging request signal for initial ranging to the base station;
means for receiving initial ranging information including delay time established for delay transmission of uplink data caused by movement of the subscriber station after initial ranging and time offset and frequency offset which are for synchronization, from the base station;
means for performing initial ranging by using a transmission parameter value included in the initial ranging information; and
means for transmitting the uplink data by using a delay time established through the initial ranging,
wherein a starting point of a fast fourier transform (FFT) interval for data is prior to a starting position of a reference FFT interval as much as the delay time, and
wherein, based on the delay time, transmitting uplink data is faster than a set timing when approaching the base station and transmitting uplink data is delayed than a set timing when leaving the base station.

17. The subscriber station of claim 16, further comprising means for controlling a transmission parameter value established through the initial ranging according to a ranging response signal received from the base station in response to a periodic ranging code for periodic ranging or a bandwidth request code transmitted for band request ranging, the ranging response signal including a transmission parameter control value.

18. The subscriber station of claim 16, wherein a size of an area in which no interference in a cyclic prefix (CP) interval positioned prior to the FFT is greater than the delay, and
wherein a starting position of the FFT interval to the uplink data transmitted from the subscriber station approaching the base station is positioned at the area in which no interference in the CP interval, and a starting position of the FFT interval to the uplink data transmitted from the subscriber station leaving the base station corresponds to the starting position of the reference FFT interval.

* * * * *